United States Patent [19]
Krambeck et al.

[11] Patent Number: 5,816,522
[45] Date of Patent: Oct. 6, 1998

[54] TENSION CONTROLLED SEAT BELT RETRACTOR

[75] Inventors: Dagoberto Krambeck; James Scanlon, both of Troy, Mich.

[73] Assignee: AlliedSignal Inc., Morristown, N.J.

[21] Appl. No.: 647,101

[22] Filed: May 9, 1996

[51] Int. Cl.[6] .................................................. B60R 22/44
[52] U.S. Cl. ........................................................ 242/375.3
[58] Field of Search ............................. 242/375.3, 375.1, 242/375.2; 280/806, 807

[56] References Cited

U.S. PATENT DOCUMENTS

| | | |
|---|---|---|
| 4,402,472 | 9/1983 | Burtscher .............................. 242/375.3 |
| 4,487,381 | 12/1984 | Kubota . |
| 4,529,143 | 7/1985 | Kanada et al. . |
| 4,546,933 | 10/1985 | Kanada et al. . |
| 4,588,144 | 5/1986 | Nishimura . |
| 4,630,841 | 12/1986 | Nishimura et al. . |
| 4,640,472 | 2/1987 | Epple ................................... 242/375.3 |
| 4,726,537 | 2/1988 | Escaravage . |

*Primary Examiner*—John M. Jillions
*Attorney, Agent, or Firm*—Markell Seitzman

[57] ABSTRACT

A seat belt retractor (20): comprising a spool (25), a frame (52) for rotationally supporting the spool, a seat belt (16) receivable on the spool, a rewind spring (100) for biasing the spool in a belt winding direction comprising a spring coil (100) having an inner spring end (103) connected to and rotated by a shaft (56) movable with the spool and an outer spring end (104) and a rotatable spring cup (70,72, 80, 81) connected to the outer spring end in continuous connection with the retractor shaft (56) for unwinding a predetermined number of coils from the spring coil in relation to the rotation of the shaft and reducing the rewind force or tensions applied to the shoulder of an occupant.

12 Claims, 5 Drawing Sheets

TENSION CONTROLLED SEAT BELT RETRACTOR

Background and Summary of the Invention

The invention is generally related to safety restraint systems and, in particular, to a tension reducing mechanism for a seat belt retractor.

Seat belt retractors used in current safety restraint systems rewind the seat belt tightly against the shoulder of the occupant of the seat. In many applications, the rewind force of the spring creates an objectionable force level or tension against the occupant's shoulder or neck which is a source of discomfort. The obvious solution to this problem is to use a weaker rewind spring, however, such a spring cannot fully rewind the seat belt from its protracted length.

To reduce this excess force or tension, some seat belt retractors used a manually adjustable tension remover in which a portion of the seat belt could be unwound from the retractor spool and the retractor spool would automatically be prohibited from rewinding the manually extended slack. The prior art has proposed many other solutions to reduce the spring force while maintaining sufficient force to rewind the webbing.

The concept of tension reduction has also been addressed using a more complicated electrical system. Frantom et al., in U.S. Pat. No. 4,655,312, teaches an electrically adjustable safety restraint system in which an electric motor is energized in response to the buckling of the adjustable tongue into buckle of the safety restraint system to wind the seat belt on the retractor's spool until a predetermined tension is detected. After the predetermined tension is sensed, the electric motor is reversed for a period of time selected to produce a predetermined slack in the shoulder portion of the seat belt.

In a conventional seat belt retractor the inner end of the rewind spring is connected to the retractor shaft, spring arbor or spool and the outer end is connected to a stationary member such as the retractor frame. As the belt is protracted the spring is wound tightly about the shaft and the rewind force level increases (see FIG. 5, curve 120). In the present invention the outer end of the spring is rotated at a slower rate than the shaft (the center of the spring) as the webbing (seat belt) is extended reducing the output force generated by the spring. This action has the net effect of extending or flattening the spring force/rotation characteristics over a larger range of shaft rotations. Conceptually this rotation may also be viewed as removing one or more spring coil windings which would decrease the force of the spring and be the case if a weaker spring were used in the first place. The present invention provides a simple mechanical solution to control the force level or tension applied to the occupant by the shoulder belt portion of the seat belt. The retractor includes a frame rotatably supporting a spool and a seat belt (webbing) is wound on the spool. A floating spring cap or cup is rotatably disposed relative to the frame. In one embodiment the spring cup is concentric with the spool axis and a gear set is used to rotate the spring cup relative to the shaft or spool in correspondence with the rotation of the spool. The retractor uses a spiral retractor spring with one end connected to the spool and the opposite end connected to the spring cap, the spiral spring producing a resilient torque rotating the spool in a rewind direction winding the seat belt on the spool.

The rotation of the spring cap relative to the position of the shaft produces a determinable reduction of the tension exerted on the shoulder of the occupant by the seat belt compared to a conventional retractor. Various other embodiments showing a number of gearing systems are also disclosed. In one of these embodiments the spring cup, gears and spring are constructed as a removable unit.

It is an object of the invention to simply and automatically control the tension imparted by the shoulder belt to an occupant's shoulder.

Another object of the invention is to provide a seat belt retractor having means to unwind the retractor's rewind spring a predetermined number of revolutions to produce a desired reduction in the tension or force level applied to the occupant's shoulder.

Accordingly, the invention comprises: a seat belt retractor having a spool and frame means for rotationally supporting the spool, with a seat belt receivable on the spool and a rewind spring for biasing the spool in a belt winding direction. The spring comprises a spring coil having an inner spring end connected to and rotated by a shaft movable with the spool and an outer spring end and first means including a spring cup connected to the outer spring end in continuous driving connection with the shaft for unwinding a predetermined number of coils from the spring coil in correspondence with the rotation of the shaft. Alternative gear or drive belt packages are shown including a direct driven spring cup and a spring cup driven through a plurality of idler gears. The spring cup may be coaxially mounted relative to the center of the retractor shaft or eccentrically mounted.

Many other objects and purposes of the invention will be clear from the following detailed description of the drawings.

DETAILED DESCRIPTION OF THE DRAWINGS

Figure 1:
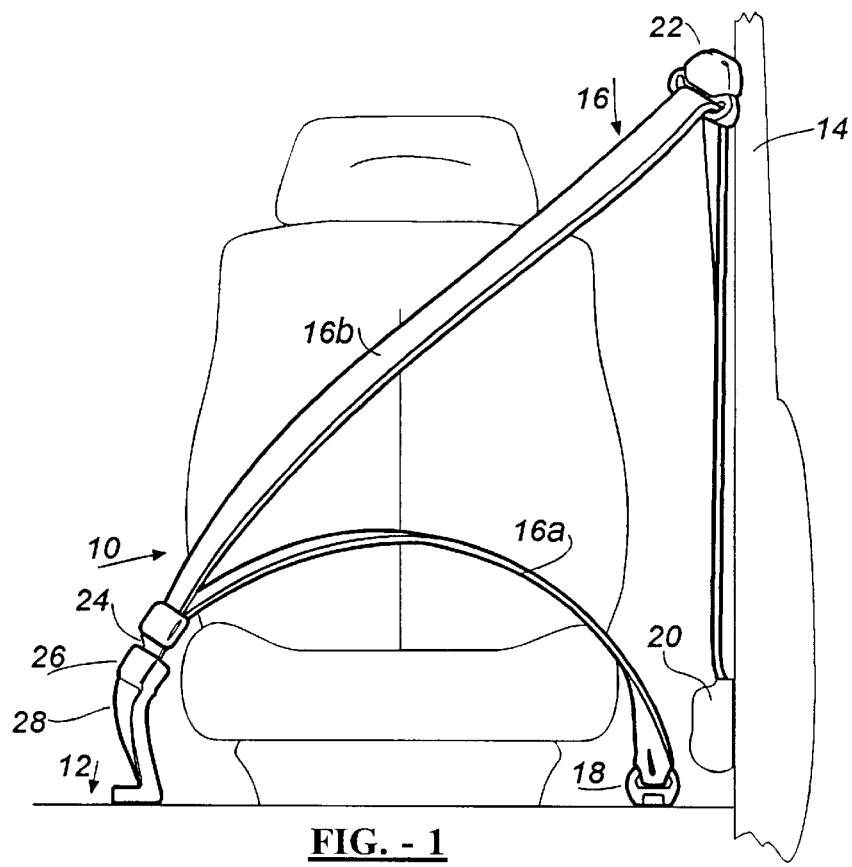
FIG. 1 is a schematic drawing of a safety restraint system.

While the present invention is described with reference to a continuous loop three-point safety restraint system having a single seat belt retractor, the concept is equally applicable to three-point systems having dual retractors or a two-point lap/shoulder belt system having a single retractor. The invention can be used in any seating position within the vehicle. It is not intended that the invention be limited to the specific embodiment illustrated in the drawings and described herein.

With reference to FIG. 1, there is shown the basic components of a continuous three-point safety restraint system used in conjunction with a front driver seat 10 of an automotive vehicle. The seat 10 is attached to the floor 12 of the vehicle in a conventional manner. The seat 10 may have a fixed relationship to the floor 12 or may be adjustable as is known in the art.

Adjacent to the seat 10 is a side pillar (B-pillar) 14. A seat belt 16 (web or webbing) is connected at one end to an anchor bracket 18 attached to the floor 12 on one side of the seat 10 or directly to the frame of the seat as is known in the art. The opposite end of the seat belt 16 is connected to a spring-loaded retractor 20, conventionally attached to the pillar 14 as shown. Alternatively, the retractor 20 may be attached to the floor 12, the back of the seat 10 or any other structural member of the vehicle.

The seat belt 16, as shown, is supported by a web guide (D-ring) 22 attached to the pillar 14 at an elevated location above the location of the shoulder of a seated occupant in a conventional manner. The portion of the seat belt 16 between the web guide 22 and the anchor bracket 18 is divided into a lap belt portion 16a and a shoulder belt portion 16b by an adjustable or slip tongue 24 of known construction.

The tongue 24 is receivable in a buckle 26, as shown, attached to the floor 12 by a buckle support 28 or any other structural member of the vehicle on the side of the seat 12 opposite the anchor bracket 18.

As is known in the art a seat belt retractor such as 20 includes a frame which rotationally supports a spool 25 about which the seat belt is wound. The spool is supported by a shaft which may be a separate part or formed integrally with the spool. The shaft is received within openings or bearings in the sides of the frame. The retractor typically includes a toothed wheel which is engaged by a locking member such as a lock dog or pawl. The locking member is moved into locking engagement with the toothed wheel under control of a vehicle sensor which is activated when vehicle deceleration exceeds a low limit value such as between 0.45–0.7g or by a web sensor when the rate of webbing protraction exceeds a low limit value such as 1.5g. Typically the various sensors are located against one side of the retractor frame. A rewind spring is located against the other side of the retractor frame.

Figure 2:
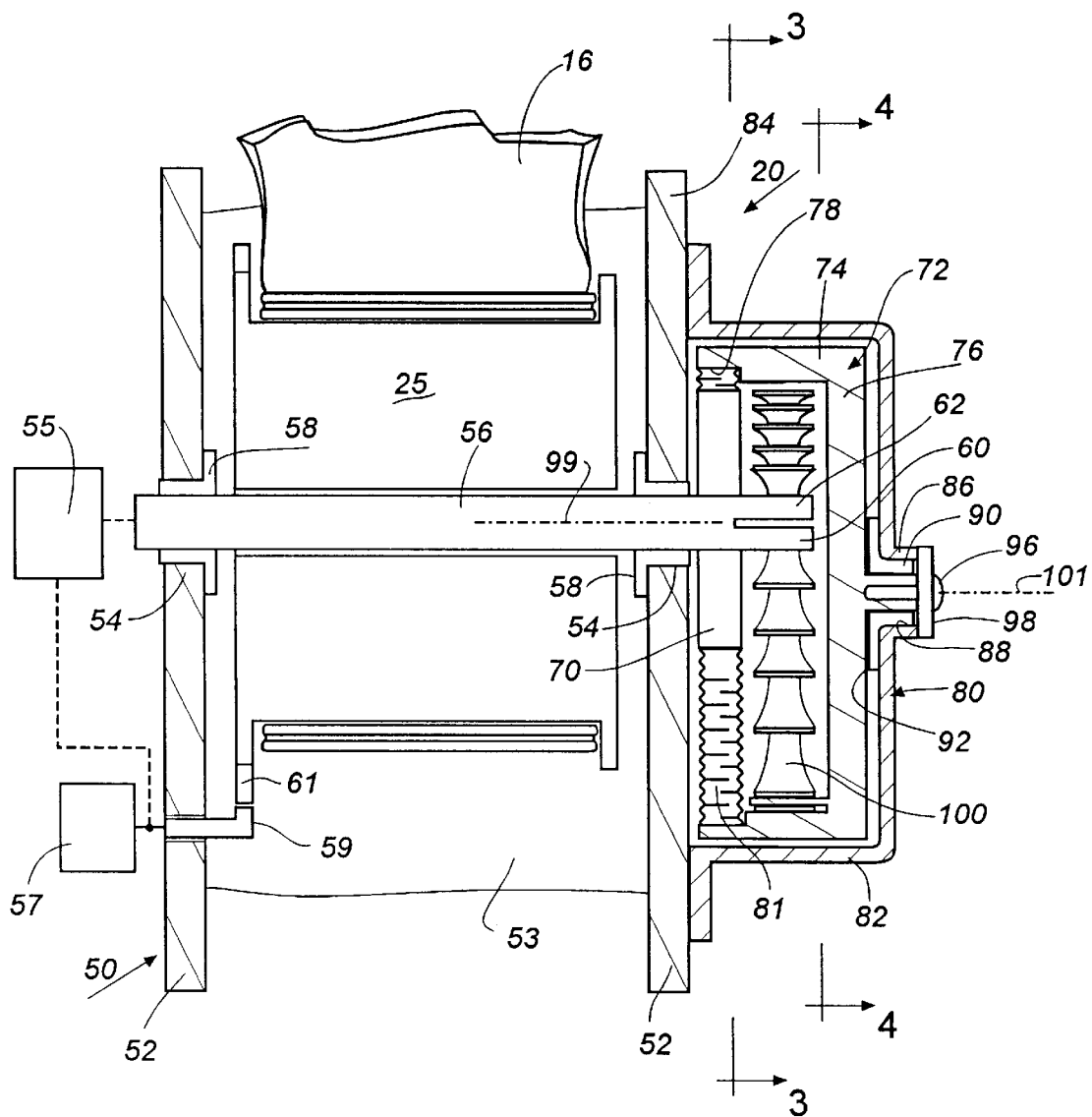
FIG. 2 is a cross-sectional view showing the major components of the present invention.
Figure 4:
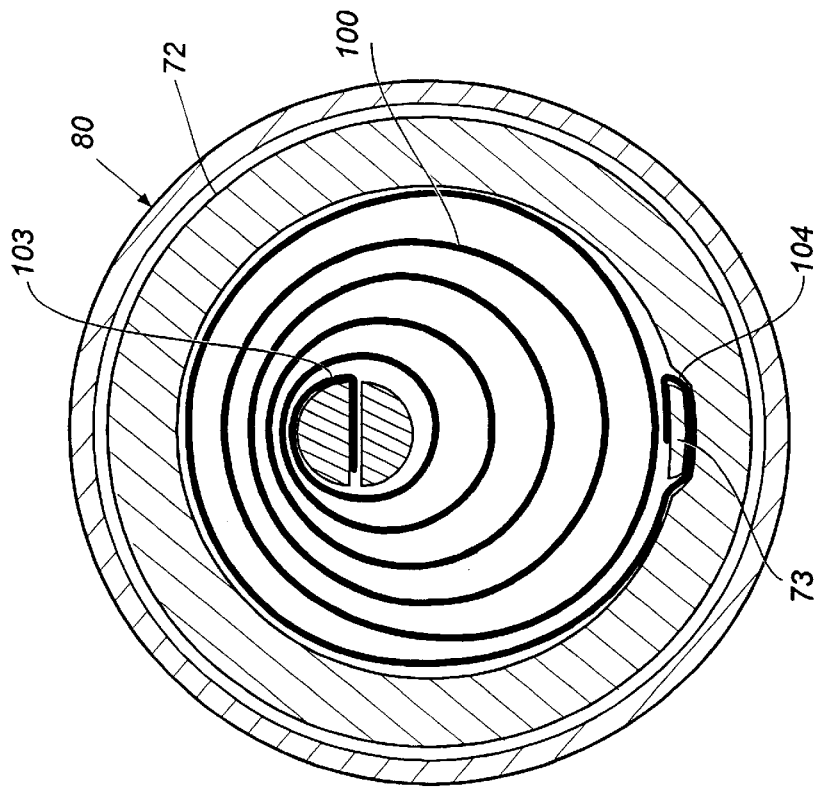
FIG. 4 is a cross-sectional side view through section lines 4—4 of FIG. 2.
Figure 3:
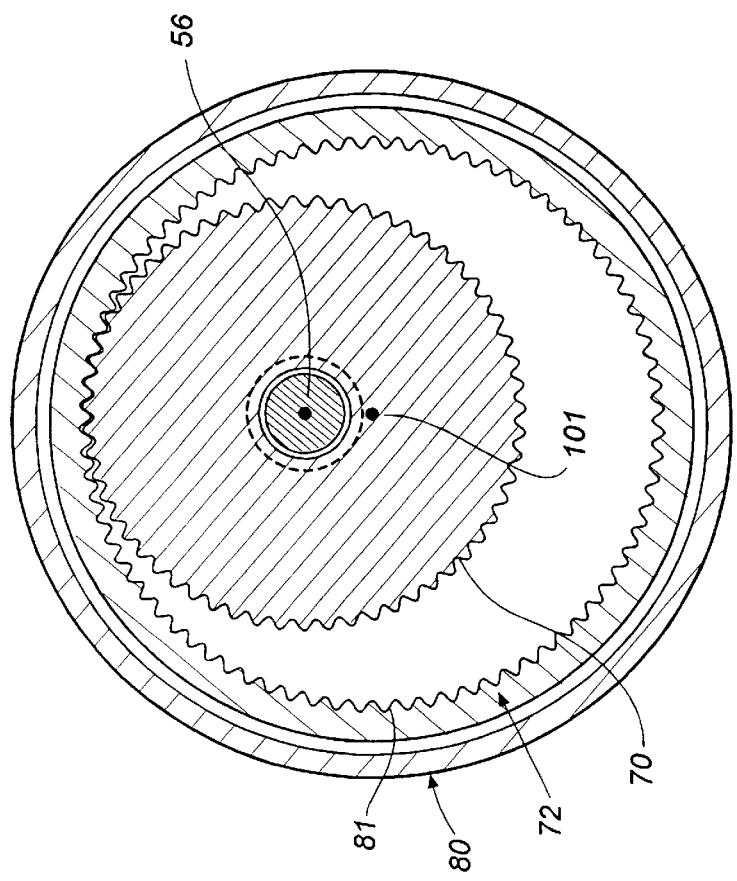
FIG. 3 is a cross-sectional side view through section lines 3—3 of FIG. 2.

Reference is made to FIGS. 2 through 4 which illustrate the details of a first embodiment of the present invention. Illustrated is a retractor 20 having a frame 50 with sides 52 and back 53. A web sensor 55 and vehicle sensor 57 are diagrammatically shown interacting with a locking pawl 59 which lockingly engages a toothed wheel 61 rotatable with a spool 25 and the shaft 56. Each side 52 includes an opening 54. The retractor shaft 56 extends through the openings 54 and is supported by bushings 58. The end 60 of the shaft 56 includes a spring arbor 62.

In the present invention a drive gear 70 is connected to and rotatable with the shaft 56. Positioned about the drive gear 70 is a rotatable spring cup 72 having side walls 74 and an end wall 76. The side wall 74 includes a groove 78 supporting a second or driven gear 81 which engages the first or drive gear 70. Alternatively, the gear 81 may be formed as an integral part of the cup 72. The spring cup 72 is rotationally supported relative to the shaft 56 and the gear 70 through a connection with an outer housing 80. The housing 80 includes side walls 82 having one or more flanges 84 used to fix the housing 80 to a side 52 of the retractor 20. The housing 80 further includes a projecting portion 86 defining a hollow bore 88 to receive a projecting part 90 of the spring cup 72. A bushing 92 interposes the part 90 and the bore 88. The projecting part and the housing 80 are axially held together by a fastener 96 and washer 98 permitting the spring cup to rotate about an axis 101 which is coaxial with the centerline of the projecting portion 86. As can be seen from the figures the axis 101 is eccentric to the centerline 99 of the shaft 56.

A rewind spring 100 having a center end 103 and an outer end 104 is connected between the spring arbor 62 and a post 73 on the periphery of the spring cup 72. The rewind spring 100 is preloaded during assembly to produce a torque sufficient to completely rewind the seat belt when the tongue 24 is unlatched from the buckle 26. This condition is normally referred to as the stored condition of the seat belt. The force generated in this stored condition is designated by letter A in FIG. 5.

Figure 5:
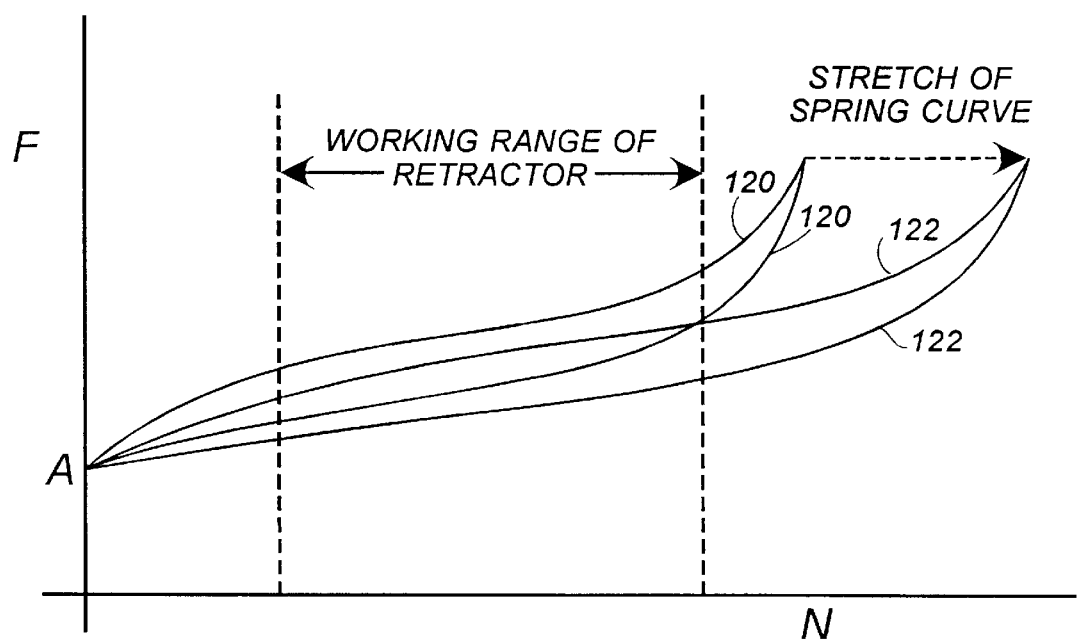
FIG. 5 diagrammatically shows the relationship between spring torque/force and spool or spring cup rotation.

FIG. 5 shows two curves illustrative of the rewind force generated by the rewind spring as a function of the number of revolutions of protraction of the retractor shaft 56. Curve 120 shows the rewind force generated by a conventional seat belt retractor. Curve 122 shows the rewind force developed by a retractor employing the teachings of the present invention. As is known in the art, when the seat belt 16 is rewound onto the spool the force curve exhibits hysteresis resulting from friction generated by the various components of the retractor.

The operation of the above retractor is as follows: When the retractor is not in use it is in a stored or parked condition in which the rewind spring has retracted the seat belt until such protraction is stopped when the latch plate or tongue abuts an obstruction such as the web guide. In this condition the rewind spring generates a determinable level of force or torque as shown by point A on curve 120 or 122 of FIG. 5. When the occupant wears the seat belt the belt is pulled outwardly causing the spool 25, shaft 56 and the center of the spring to rotate in a belt unwinding direction. The rotation of the shaft causes the spring cup 72 to also rotate in an unwinding direction effectively unwinding the outer end 104 of the spring coil reducing the torque being applied to the spool 68 and hence the force or tension applied to the occupant's shoulder. As can be seen there is a noticeable flattening of the force/spring cup (or spool) rotation (N) curve.

In the various embodiments shown the gearing between the spring cup and gear 70 can be set to provide the desired force/spring (N) rotation characteristic with the spring cup rotating at a reduced ratio. Although the preferred embodiment of the invention uses a gear reduction there might arise situations in which a 1:1 ratio is desired. Typically this gear ratio might be in the range of 2:1 to 5:1. Typically the spring cup 72 will be rotated approximately 9 turns as the shaft turns 27 turns. When the tongue is unbuckled the rewind spring will rewind the seat belt back upon the spool 25. As this happens the spring cup is rotated in a belt winding direction in proportion to the gear ratio.

Figure 7:
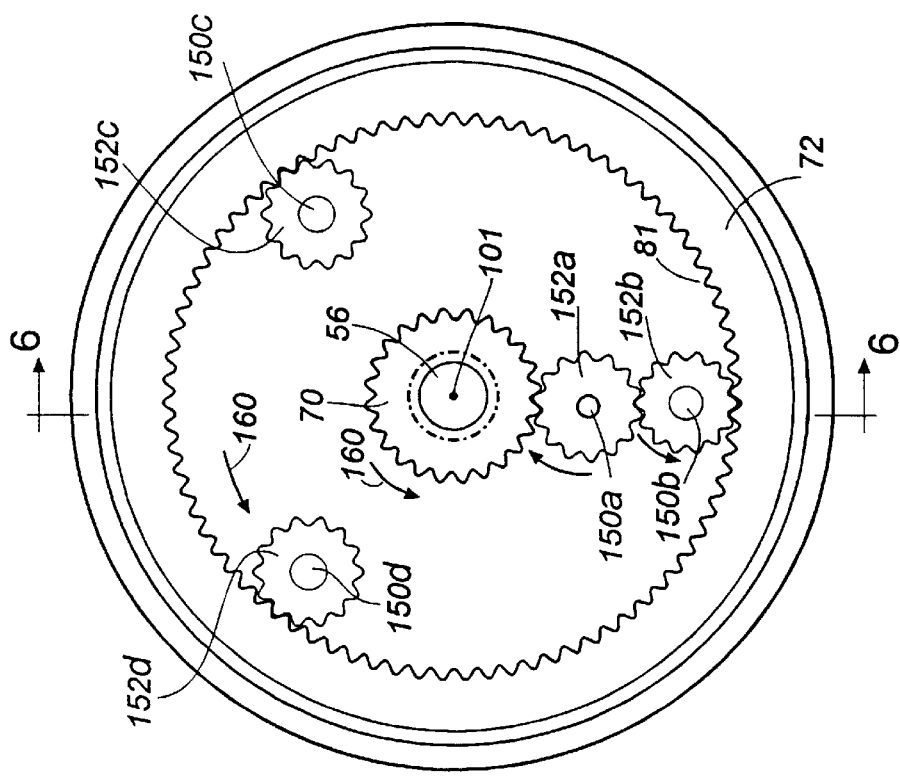
FIGS. 6 and 7 illustrate an alternate embodiment of the invention.
Figure 6:
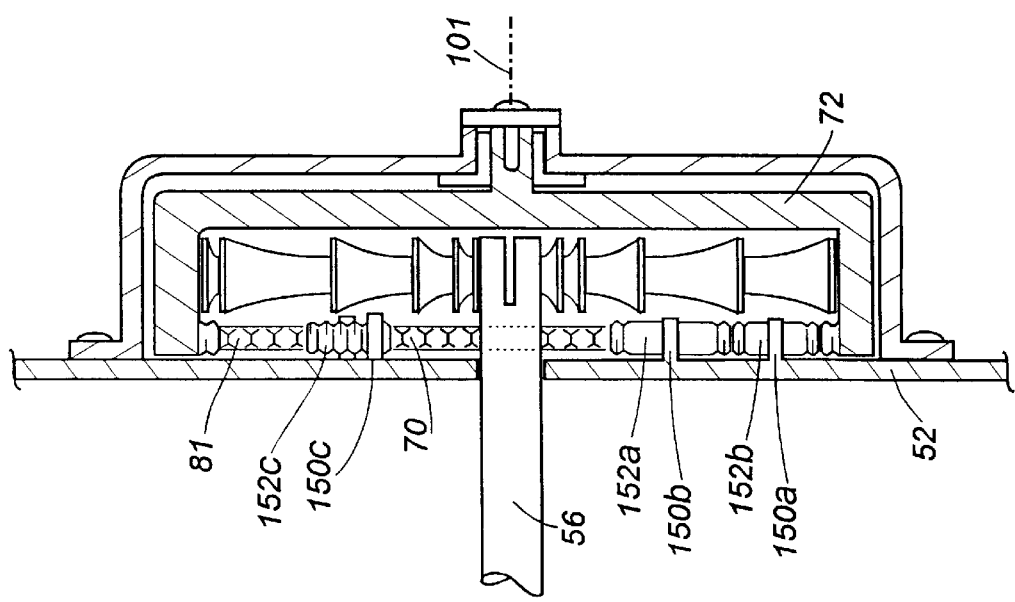

FIGS. 6 and 7 illustrate an alternate embodiment of the invention utilizing a different type of gear mechanism to drive the spring cup 72. In this embodiment of the invention the housing 80 and spring cup 72 are mounted to the retractor frame side 52 such that the rotational axis 101 of the spring cup is coaxial to the rotational axis of the shaft 56. The spring cup also includes or supports a gear 81. In this embodiment of the invention the frame supports a plurality of pins 150a–150d. Supported on pins 150a and 150d are idler gears 152a and 152b. These gears are driven by the drive gear 70. The purpose of the idler gears 152c and 152d is to assist in maintaining the concentricity of the spring cup 72 relative to the shaft 56. These idler gears may optionally be removed. As can be appreciated this gearing design also permits the spring cup 72 to rotate in the direction of rotation of the shaft in relation to the effective gear ratio of therebetween. The arrows such as 160 generally show the rotation of the gears 70, 152a, 152b and 80. The operation of this embodiment of the invention is essentially identical to that of the above described embodiment in that as the webbing is protracted the spring cup and the outer end of the spring (attached thereto) are turned in the same direction as that of the shaft to reduce the level of rewind force.

Figure 9:
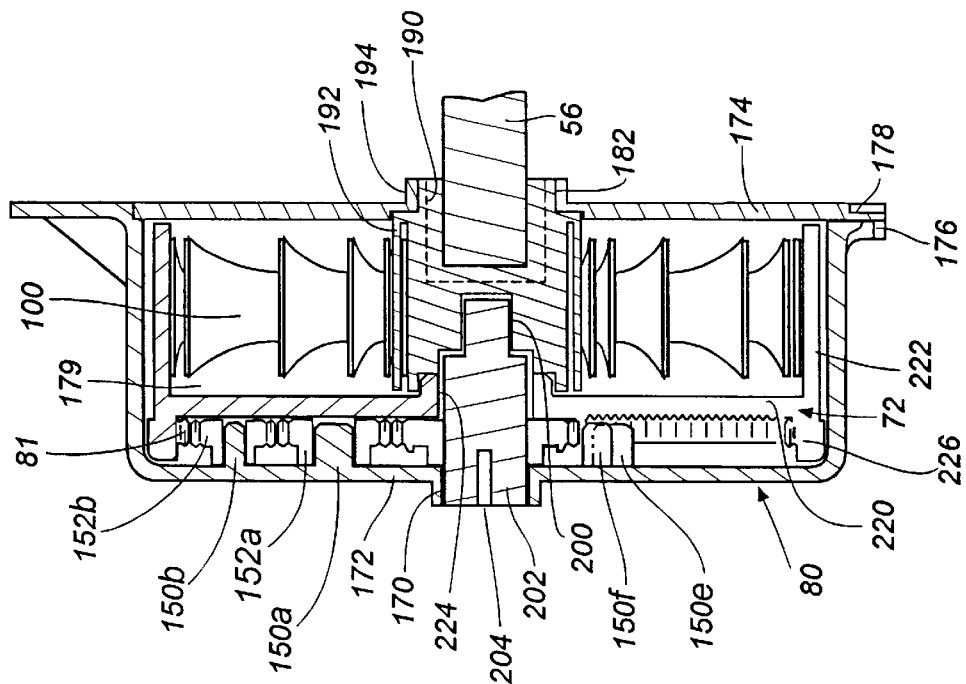
FIGS. 8 and 9 illustrate a third embodiment of the present invention.
Figure 8:
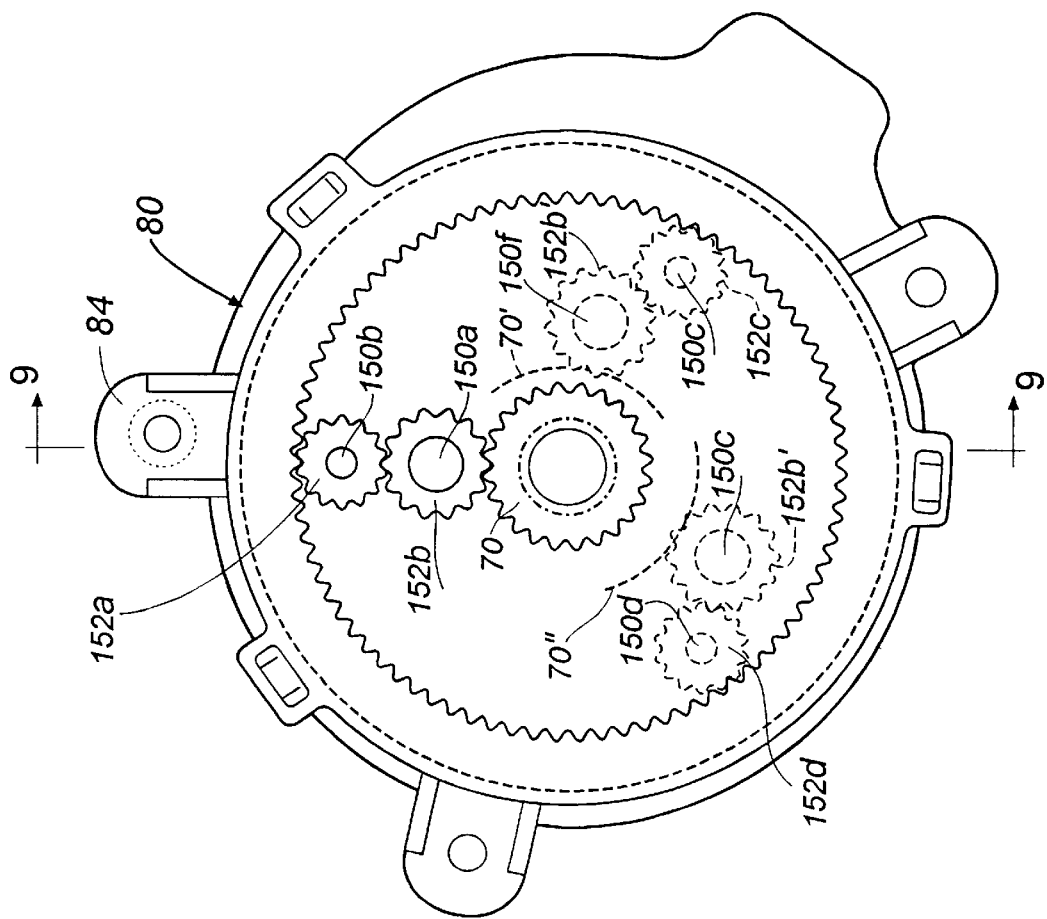

FIGS. 8 and 9 illustrate a another embodiment of the invention. As will be seen by the description below the benefit achieved by this third embodiment of the invention is that the drive gear 70, spring cup 72, housing 80 and other components can be slid upon any shaft as an integral unit thereby reducing assembly time and cost. This embodiment also utilizes the main drive gear 70 and a plurality of idler gears 152a and 152b. Because of the integral construction, the concentricity of the various gears is maintained by the housing 80 and the idler gears 152d and 152c may optionally be removed. The relationship between gears 70, 152a and b and the gear 81 formed on the spring cup 72 is illustrated in FIG. 8. FIG. 9 illustrates a cross-sectional view of the housing which is generally similar to the housing shown in FIG. 6. The housing 80 includes an opening 170 in its outer wall 172 and also includes a base plate 174 secured at its periphery 176 to a flange 178 forming a cavity 179 therebetween. The base plate 174 includes a central opening 182. Positioned in this central opening is a spring arbor 190 having an open slot 192 to receive the inner end 103 of the rewind spring 100. The left hand end of the spring arbor 190 is rotationally supported relative to a flange 194 formed on the base plate. The spring arbor includes a stepped bore 200 into which is received a spring winding shaft 202 that extends through the opening 170 in the housing 80. The spring winding shaft 202 includes a keyed opening 204 to permit the spring to be wound after assembly, in a known manner. As can be seen from FIG. 8 the housing 80 includes a plurality of inwardly extending projections which form integral posts 150a and 150b which rotationally support the idler gears 152a and 152b. The posts 150c and 150d are similarly integrally molded within the housing 80. The spring cup 72 is positioned between the housing 80 and its plate 174. The spring cup 72 includes a base 220 and side wall 222 and a post similar to post 73 shown in FIG. 4 to receive the outer end 104 of the rewind spring. The spring cup also includes a center opening 224 through which the shaft 204 extends. The shaft 204 functions as a bearing to rotationally support the spring cup. The spring cup has an extending wall 226 having gear 81 formed thereon which is operatively connected to the teeth of the idler gears 152a (and gears 152e and d, if used). The housing 80 additionally includes a plurality of flanges 84 to permit connection to the retractor frame.

In this embodiment the assembled housing unit is slid upon the shaft 56 and attached to a frame side. The shaft 204 is rotated to wind the spring and rotate the seat belt webbing onto the spool. Thereafter the spring cup follows the rotation of the shaft, winding and unwinding the outer end of the rewind spring 100 to control the rewind force or tension developed by the rewind spring as the occupant moves the seat belt to and from its stored condition.

Reference is again briefly made to FIG. 8 which illustrates still another embodiment of the present invention. As mentioned above, the housing 80 includes a plurality of preformed posts to support the idler gears 152a–152d. The housing 80 may additionally include two other posts 150e and 150f. The location of the posts 150b, e and f relative to the center of the housing and the centerline of the shaft 56 are somewhat different so that the gear ratio between the shaft and spring cup can be easily changed. As an example, a first gear ratio can be achieved by utilizing the drive gear combination of gears 70, 152b (supported on post 150a) and gear 152a (supported upon post 150b). This relationship has been described above. If it is desired to define a different gear ratio between the motion of the shaft and the motion of the spring cup the designer needs only to simply change the gear diameter of the drive gear (shown in phantom line) as illustrated by numeral 70' and/or the diameter of gear 152b', which would now be located on for example post 150f. In this alternative the drive gear set would begin with gear 70' which would then drive idler gear 152b' which in turn drives idler gear 152c. Idler gear 152a (which is not driven in this embodiment) may be used to ensure the concentricity of the spring cup as mentioned above. The gear 152b is not used in this embodiment. As can be seen, a further gearing relationship can be achieved by appropriately sizing drive gear 70" and the idler gear 152b'0 which is located upon post 150e. As can be appreciated from the above, an obvious benefit from this last embodiment of the invention is that changes in the effective gear ratio can be achieved by changing to only a minimum number of the components of the present invention.

Many changes and modifications in the above described embodiment of the invention can, of course, be carried out without departing from the scope thereof. Accordingly, that scope is intended to be limited only by the scope of the appended claims.

We claim:

1. A seat belt retractor (20) comprising:

a seat belt retractor (20) comprising:

a spool (25) and frame means (52) for rotationally supporting the spool;

a seat belt (16) receivable on the spool, rewind spring means (100) for biasing the spool in a belt winding direction comprising a spring (100) having an inner spring end (103) connected to and rotated by a shaft (56) movable with the spool and an outer spring end (104);

first means (70, 72, 80, 81) connected to the outer spring end in continuous driving connection with the shaft for unwinding a predetermined number of coils from the spring coil in correspondence to the rotation of the shaft;

wherein the first means includes a spring cup (72) rotatably disposed about the shaft including holding means (73) for holding the outer spring end (104), the spring cup including a driven member (81), the first means further including a drive member (70, 70', 70") operatively connected to the shaft for driving the driven member in the same direction as the shaft.

2. The device as defined in claim 1 wherein the spring cup is eccentrically positioned relative to a centerline of the shaft (56) and wherein the drive member (70) directly drives the driven member (81) at a predetermined ratio.

3. The device as defined in claim 1 wherein the drive member is connected to the driven member through more than one idler gears (152).

4. The device as defined in claim 3 wherein the spring cup is concentric with the centerline of the shaft.

5. The device as defined in claim 4 wherein the idler gears are connected to the frame means.

6. The device as defined in claim 1 wherein the inner spring end is directly connected to the shaft.

7. The device as defined in claim 1 including a housing (80) for rotationally supporting the spring cup.

8. The device as defined in claim 7 wherein the housing (80) includes a spring arbor (190) slidable upon an end of the shaft, and wherein the drive member (70) is located within the housing and driven by the drive member, the housing including a plurality of posts (152) for rotationally supporting respective idler gears (150) which link the driven and the drive members.

9. The device as defined in claim 1 wherein the drive member is connected to the driven member through a force transmission element.

10. A retractor comprising:

a frame rotatably supporting a spool, and a seat belt having one end attached to the spool and adapted to be wound thereon, a housing adjacent to one end of the spool;

a spring cup rotatably disposed in the housing, the spring cup having a driven gear;

a spiral spring disposed in the spring cup, one end of the spiral spring being fixedly attached to the spring cup and an opposite end connected to rotate with the spool, the spiral spring biasing the spool to rotate in a rewind direction to rewind the seat belt upon the spool of the retractor;

a drive gear rotatable with the spool for driving the driven gear to rotate the spring cup relative to the housing to unwind an outer end of the spring.

11. A seat belt retractor (20) comprising:

a spool (25) and frame means (52) for rotationally supporting the spool;

a seat belt (16) receivable on the spool, rewind spring means (100) for biasing the spool in a belt winding direction comprising a spring (100) having an inner spring end (103) operatively connected to and rotatable with the spool (25) and an outer spring end (104);

first means (70, 72, 80, 81) connected to the outer spring end in driving connection with the spool for unwinding a predetermined number of coils from the spring coil in correspondence to the rotation of the spool;

wherein the first means includes a spring cup (72) including securing means (73) for securing the outer spring end (104), the spring cup including a driven member (81), the first means further including a drive member (70, 70', 70") operatively connected to the spool for driving the driven member in the same direction as the spool.

12. A seat belt retractor (20) comprising:

a spool (25) and frame means (52) for rotationally supporting the spool;

a seat belt (16) receivable on the spool, rewind spring means (100) for biasing the spool in a belt winding direction and for generating a return force on the belt, comprising a spring (100) having an inner spring end (103) operatively connected to and rotatable in concert with the spool and an outer spring end (104);

force reducing means (70, 72, 80, 81) connected to the outer spring end in driving connection with the spool for effectively unwinding a predetermined number of coils from the spring coil in correspondence to the rotation of the spool for controllably reducing the return force on the belt created by the spring;

wherein the force reducing means includes a spring cup (72) including securing means (73) for securing the outer spring end (104), the spring cup including a driven member (81), the force reducing means further including a drive member (70, 70', 70") operatively connected to the spool for driving the driven member in the same direction as the spool.

* * * * *